Oct. 18, 1932.        H. H. BARBER         1,882,737
                      WEIGHING HOPPER
             Filed Oct. 11, 1929    4 Sheets-Sheet 1
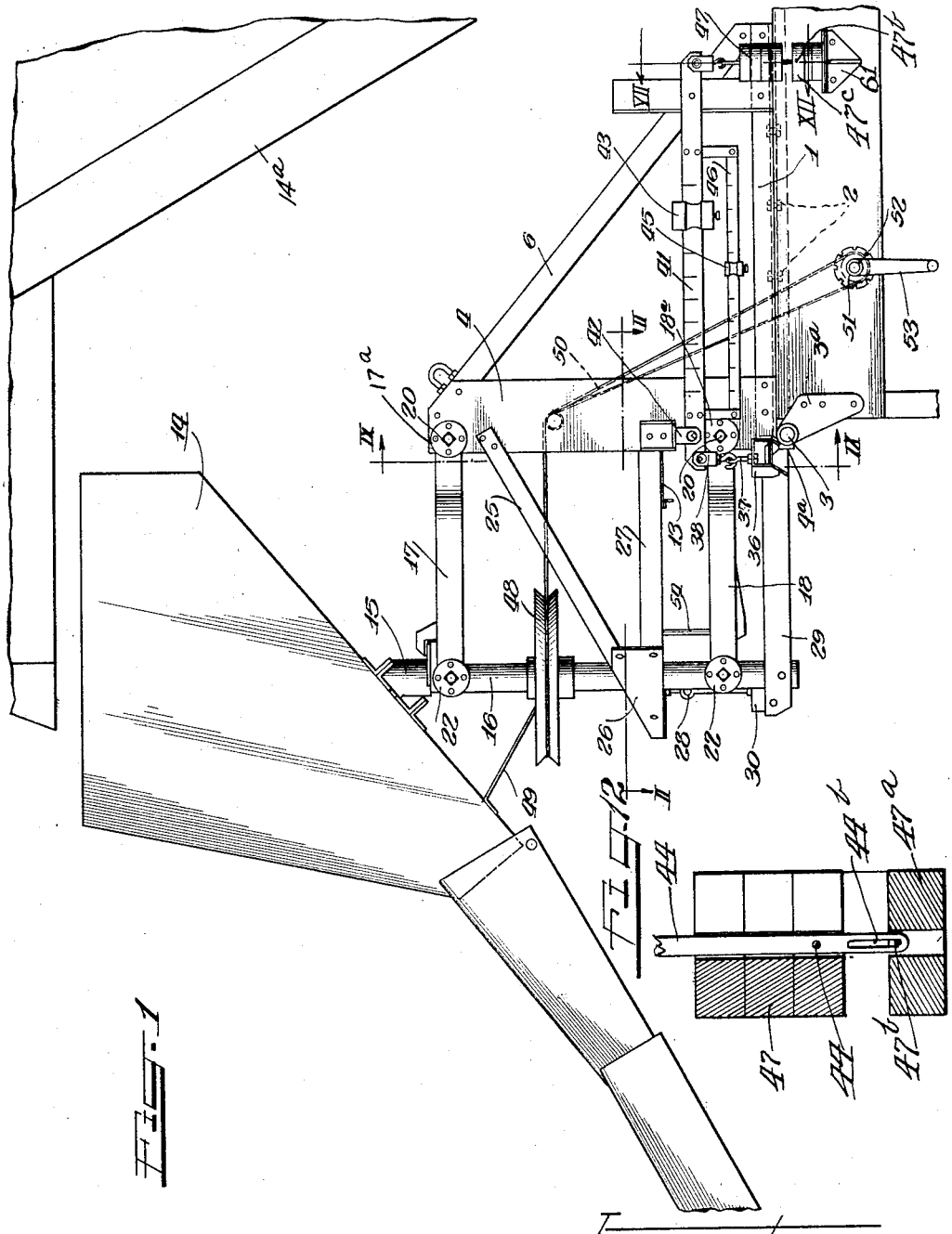
Inventor:
Harry H. Barber.
by: Charles D. Will
        Atty.

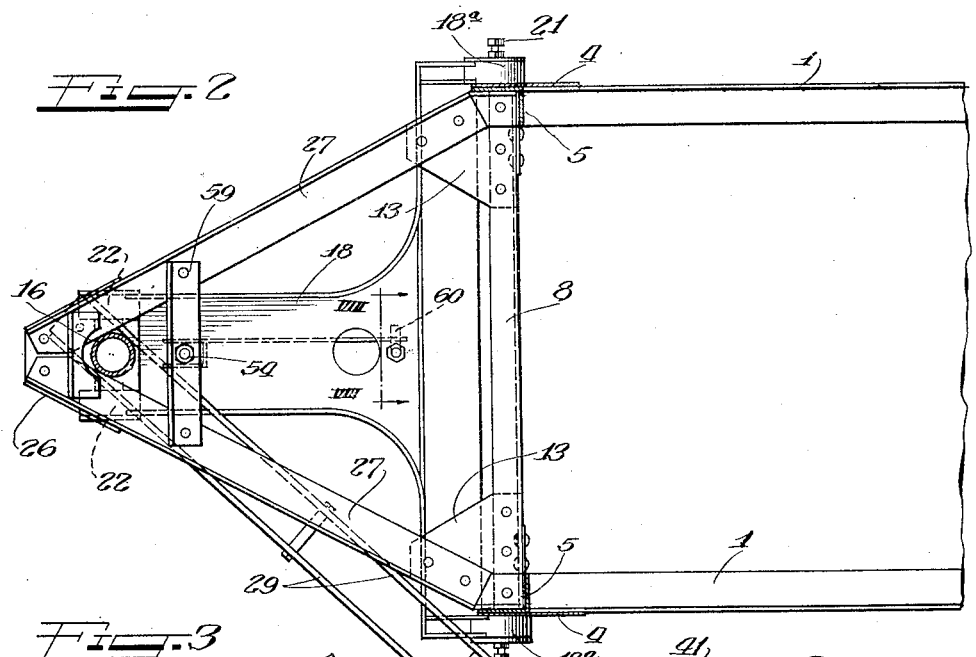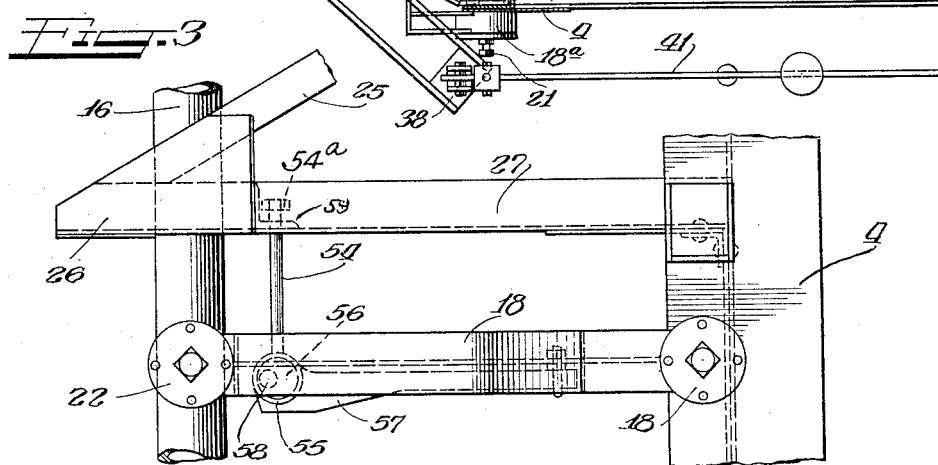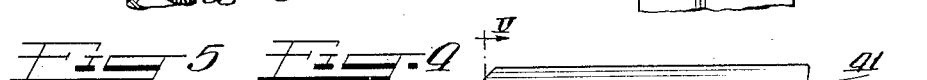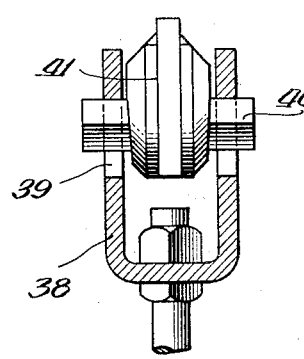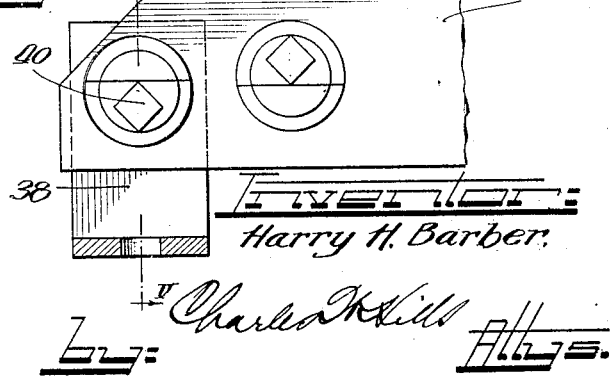

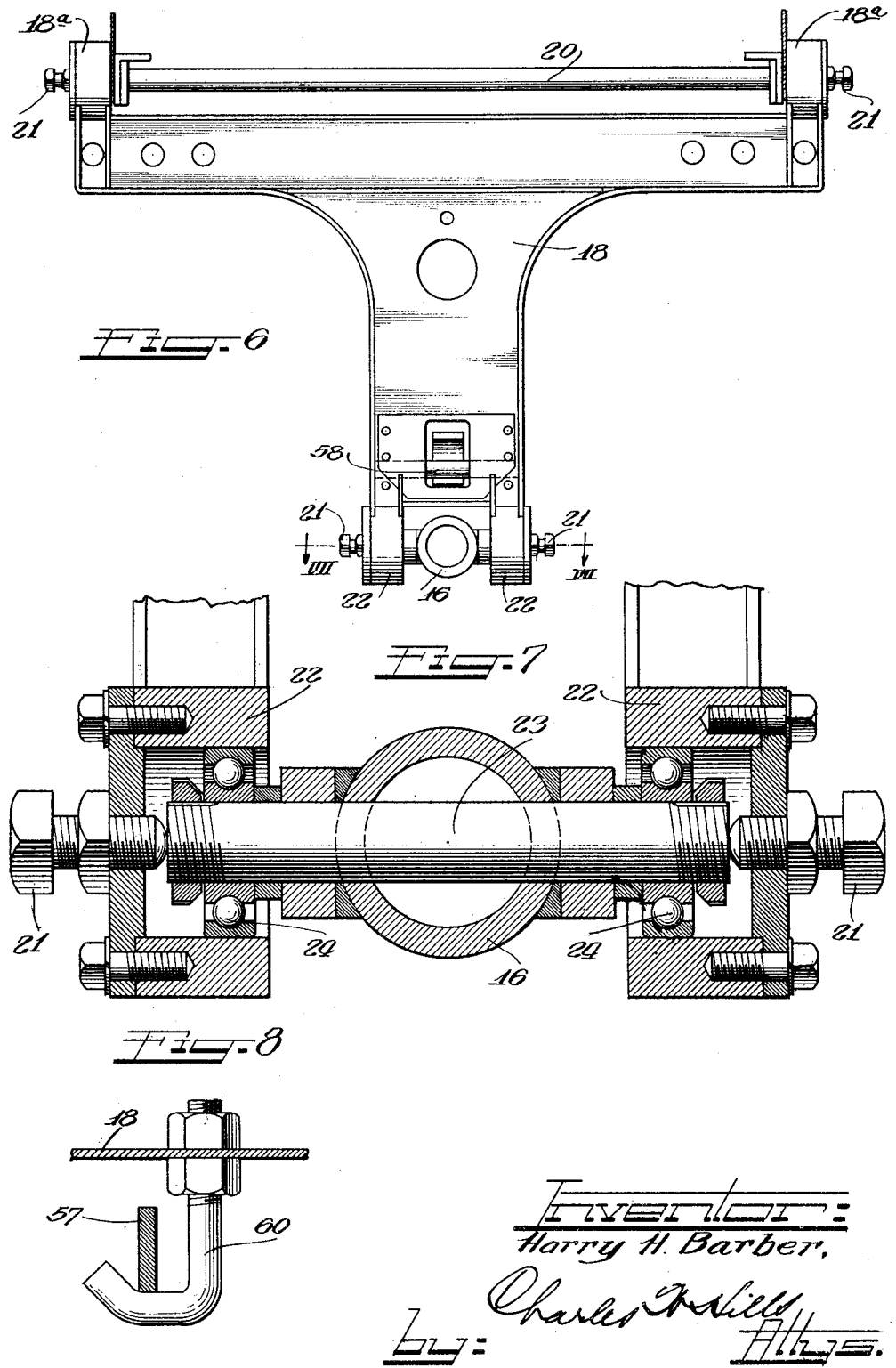

Oct. 18, 1932.   H. H. BARBER   1,882,737
WEIGHING HOPPER
Filed Oct. 11, 1929    4 Sheets-Sheet 4
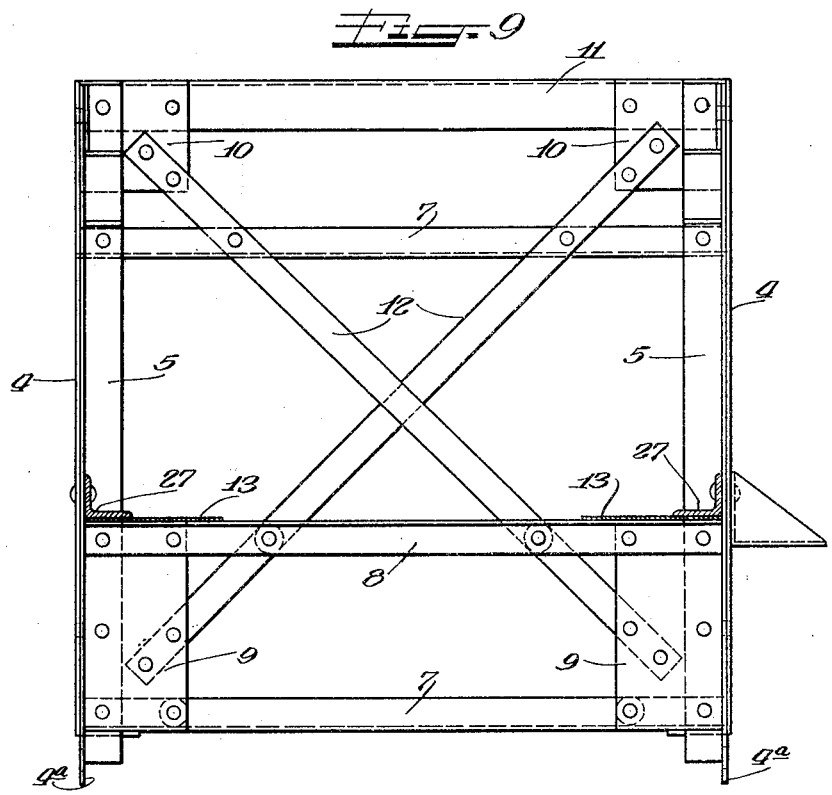
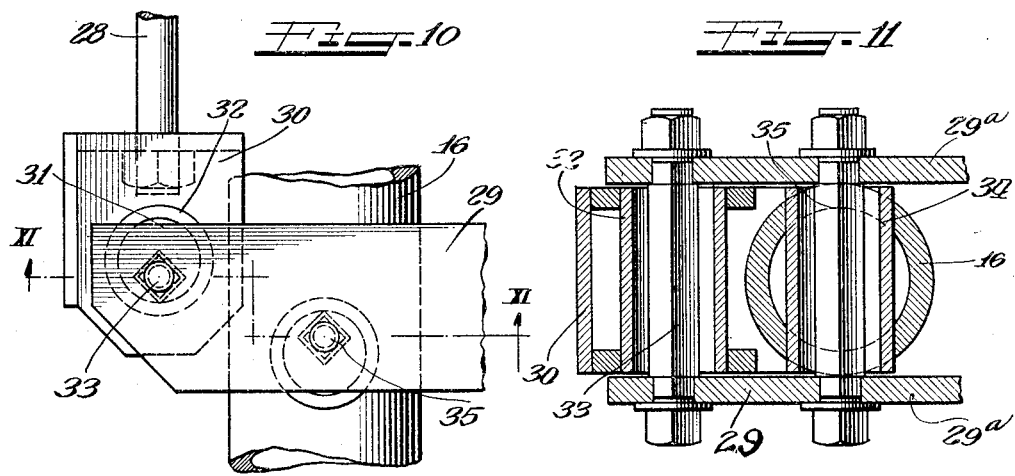
Inventor:
Harry H. Barber.
by Charles T. Hill
Attys.

Patented Oct. 18, 1932

1,882,737

UNITED STATES PATENT OFFICE

HARRY H. BARBER, OF AURORA, ILLINOIS, ASSIGNOR TO BARBER-GREENE COMPANY, OF AURORA, ILLINOIS, A CORPORATION OF ILLINOIS

WEIGHING HOPPER

Application filed October 11, 1929. Serial No. 398,896.

This invention relates to a weighing hopper for loading machines, whereby sand and cement or the like may be accurately weighed for road building or for building construction. The invention concerns itself primarily with means for supporting the weighing hopper so that the same may move with very little friction for operating the weighing scale.

This invention comprises the novel structure and combination of parts hereafter described and more particularly pointed out and defined in the appended claims.

In the accompanying drawings, which illustrate a preferred form of this invention and in which similar reference numerals refer to similar features in the different views:

Figure 1 is a side elevational view of a weighing hopper including the framework by means of which it is attached to the loading machine.

Figure 2 is an enlarged sectional view taken upon the line II—II of Figure 1.

Figure 3 is an enlarged fragmentary elevational view of the supporting means for the hopper.

Figure 4 is a part elevational and part sectional view illustrating a part of the scale beams.

Figure 5 is a sectional view taken upon the line V—V of Figure 4.

Figure 6 is a top plan view of a parallel motion arm which is attached to the hopper post.

Figure 7 is an enlarged sectional view taken upon the line VII—VII of Figure 6.

Figure 8 is an enlarged sectional view taken upon the line VIII—VIII of Figure 2.

Figure 9 is a part sectional, part elevational view taken upon the line IX—IX of Figure 1, with parts omitted.

Figure 10 is a fragmentary elevational view of the hopper supporting means and its connection with the weighing apparatus or scale.

Figure 11 is an enlarged sectional view taken upon the line XI—XI of Figure 10, looking in the direction of the arrows.

Figure 12 is an enlarged sectional view taken upon the line XII—XII of Figure 1.

According to this invention, a frame is mounted upon the rear end of the loader and is removably fastened thereto, in order that said frame may be released and tilted upon its pivot when it is desired to elevate the boom into horizontal position. The weighing hopper is supported upon this frame for vertical movement with as little friction as possible, and is connected to the weighing apparatus, which is responsive to the vertical movement of the hopper.

The frame which is attached to the loader consists principally of a plurality of angle members 1, which are removably attached to suitable frame members on the loader by means of bolts 2, as shown in Figure 1. The rear end of the angles 1 are pivotally connected by means of a rod 3 to suitable brackets 3a attached to the framework of the loading machine, whereby, when the bolts 2 are removed, the frame may be tilted upwardly upon the rod 3 as a pivot so that the hopper and its attaching members may be lowered, allowing the boom to be elevated between the two angle members 1. A pair of parallel vertical plates 4 are attached at their lower ends to the rear portions of the angles 1.

A pair of angle members 5 are attached to the inner sides of the plates 4, one in connection with each plate, and they extend slightly therebelow. It will be noted that one flange of each angle lies adjacent the inner face of a vertical plate and the other flange extends inwardly so that the angle formed by each angle member 5 faces rearwardly. A pair of sloping members 6 connect the upper ends of the plates 4 with the base angles 1 to provide a rigid frame structure. A pair of transverse angle members 7 and 8 connect the vertical angle members 5 as shown in Figure 9. The angle members 7 have their outstanding flanges directed forwardly, while the angle member 8 has its outstanding flange directed rearwardly, for a purpose that will later appear. Suitable gusset plates 9 are attached to the lower transverse angle member 7, the angle member 8 and the vertical angle 5 and suitable gussets 10 are attached to the upper ends of the frame including a transverse angle member 11 which connects the upper ends of the vertical angle members 5. Suitable crossed bracing members 12 are connected to the respective gusset plates as shown in Figure 9 for rigidifying the frame. In referring to Figure 9, it will be noted that the vertical angle members 5 have longitudinally extending flanges projecting downwardly as indicated at 4a, and these projecting portions 4a are suitably apertured for receiving the pivot rods 3. Suitable gusset plates 13 are attached to the intermediate transverse angle member 8 for a purpose that will later appear.

A weighing hopper 14, provided with a bearing socket 15 which fits over a vertical post 16 for relative rotation with respect thereto, is supported by the aforedescribed frame in a manner that will presently be set forth. Material is adapted to be supplied to the hopper by a conveyor 14a only a portion of which is shown.

To this end, a pair of parallel motion arms 17 and 18 are pivotally mounted on the frame. These parallel motion arms 17 and 18 are somewhat in the form of a yoke, as shown in Figure 6. The upper arm 17 is mounted upon the ends of a shaft 20, which is carried by the frame, and the lower arm 18 is carried by a similar shaft 20 which is secured to the framework on the loader. The arm 17 carries a pair of hubs 17a and the arm 18 carries a pair of hubs 18a. These hubs surround the ends of the shafts 20 and suitable ball bearings are located between the shaft 20 and said hubs. Adjustable screws 21 extend through the ends of the hubs and engage the ends of the shafts 20, whereby the parallel motion arms may be readily adjusted. The ball bearings in the aforementioned hubs and the adjustable screws 21 are substantial duplicates of the ball bearings and set screws shown in Figure 7, and require no further illustration. The outer end of each arm 17 and 18 is provided with a pair of bearing hubs 22, as shown in Figures 6 and 7. A shaft 23 is rotatably mounted in these hubs by means of ball bearings 24. The adjustable bolts 21 extend through the ends of the hub 22 for engaging the ends of the shaft 23, whereby relative adjustment of the parts is possible. Each shaft 23 extends through the supporting post 16 of the hopper 14. Due to the fact that the parallel motion arms 17 and 18 are connected by ball bearings with the vertical hopper post 16 and with the frame members, very little, if any, friction is encountered when the hopper is being filled and descends, as will hereinafter be more fully set forth.

A rigid frame extends outwardly from the aforedescribed frame upon the loader. This second frame, which may be termed an auxiliary frame, consists of a pair of downwardly sloping members 25 which converge and are attached to the side flanges of the shoe 26, as shown in Figure 1. The bottom of the shoe is provided with a suitable aperture for freely receiving the hopper post 16. The auxiliary frame further comprises a pair of angle members 27 which are attached to the gusset plates 13 and the angles 5 and plates 4. These angle members 27 converge in a similar manner to the inclined bars 25, and they are attached to the bottom of the shoe 26 as shown in Figure 2. It will be obvious that this auxiliary frame is a rigid construction with respect to the main frame upon the loader. The purpose of this auxiliary frame, which may also be termed a support, is for suspending the rear end of a weight lever 29 which, it will be noted, is suspended from the auxiliary frame by means of a rod 28 which carries a block 30 at its lower end. The block 30 is provided with a cylindrical recess 31 in which a cylindrical bearing 32 is secured. A polygonal knife edge shaft 33 connects the two members 29a that form the weight lever 29 with the bearing block 30. It will be noted that the shaft 33 extends through the circular recess and that one of its knife edges is adapted to contact the lower wall of the recess and form a fulcrum upon which the weight lever may pivot.

A cylindrical bearing 34 extends through the hopper post 16, as shown in Figure 11, and a knife edge shaft 35 extends through the cylindrical bearing 34 and connects the two members 29a with the hopper post 16. The free ends of the weight members 29a are connected together by a clevis 36, as shown in Figure 1, and this clevis carries an eye-member 37 which is engaged by a hook on a clevis 38 (see Figures 1, 4 and 5). The arms of the clevis 38 are provided with cylindrical apertures 39 for receiving the end portions of a knife edge shaft 40 on a scale beam 41. A short distance forward of the knife edges 40, the scale beam 41 is provided with similar knife edge projections for engaging in circular apertures of a hanger 42, as is well known in the art. The scale beam or weighing apparatus, which may be of any well known construction is shown as having a slidable weight 43 and a second slidable weight 45 on an auxiliary arm 46. From the main arm 41 are suspended the usual weights 47, as is well known in the art.

The weights 47 are carried upon a rod 44 suspended from the scale beam in the usual manner, and the lower most weight 47 is secured to the rod as indicated at 44a (Figure 12). It will be noted that the rod 44 extends below the lowermost weight 47 and this extending portion is slotted as indicated at 44b and is intended to extend through the aperture of a tell-tale weight 47a which has a pin 47b extending through said slot. When the hopper is empty the scale beam will be in its lowered position with the rod 44 extending through the aperture in the tell-tale weight 47a which normally rests upon a support 61. As the hopper is being filled, the scale beam and rod 44 with the weights 47 thereon will rise and when the hopper is about full, the lost motion between the rod 44 and the tell-tale weight will have been taken up and the tell-tale weight will begin to move upwardly. This upward movement of the tell-tale weight will serve as a signal or notice to the operator that the hopper is full so that he can stop the machine and empty the same.

A pulley 48 is rotatably journalled upon the hopper post 16, and this pulley is connected with the hopper 14 by means of a connecting brace 49, so that the hopper will be forced to rotate with the pulley 48. The pulley 48 is adapted to be rotated by a cable 50, which is connected to a drum 51 secured upon a shaft 52, which is adapted to be manually rotated by a crank arm 53, whereby the hopper may be rotated to discharge its contents in various directions.

According to the foregoing construction, it will be apparent that, as material is loaded into the hopper 14, it will gradually sink downwardly, the post 16 freely sliding through the rigid frame or support 25–27 and the parallel arms 17–18 freely swinging therewith, and, on account of the ball bearing connection with the hopper and the supporting frame on the loader, very little friction will be encountered. As the hopper gradually moves downwardly, as it is being loaded, it will cause the weight lever 29 to tilt downwardly with respect to the knife edge shaft 33 as a fulcrum and operate the weighing apparatus, consisting of the above mentioned scale beam and weights for allowing the operator to determine the weight of the contents of the hopper.

When the machine is traveling from place to place, or when it is desired to fixedly support the hopper, mechanism is provided whereby the hopper may be supported upon the auxiliary frame. This mechanism consists of a rod 54, which is attached at its upper end to the auxiliary frame and which is provided with a loop 55 at its lower end, which surrounds an eccentric 56 rigidly secured to a lever 57 and rotatably mounted upon a small shaft 58 secured to the lower arm 18. With reference to Figure 2, it will be noted that a small angle bar 59 connects the two angle bars 27 for supporting the upper ends of the suspension rod 54. The lever 57 normally lies adjacent the arm 18 and is held in a predetermined position by a hook member 60, (Figure 8) which is attached to the arm 18. When the weighing hopper is in operation, the lever 57 is by the hook 60. It will be noted that when the lever 57 is supported by the hook 60, the nut 54a on the upper end of the rod 54 is above the support 59 so that sufficient movement is allowed for the hopper to descend. When it is desired to move the apparatus from place to place, the lever 57 is unhooked and allowed to drop down whereby the hopper will be suspended by the rod 54.

From the foregoing, it will be readily appreciated that a novel mechanism has been provided for supporting a weighing hopper and allowing it to gravitate downwardly for actuating a weighing apparatus with very little or no friction, and that it is possible to rigidly secure the weighing hopper.

It will be appreciated that by supporting the frame upon a stationary pivot so that the frame may be swung downwardly for the purpose of providing proper space for elevating the boom, it is unnecessary to remove the weighing hopper when traveling from place to place.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In an apparatus of the class described, a main frame, an auxiliary frame rigid with said main frame, a pair of parallel motion arms having anti-frictional connection with said main frame, a hopper post secured to said parallel motion arms, a weighing apparatus upon said main frame, a lever having one end connected to said weighing apparatus and the other end connected to said hopper post, and means for suspending said lever from said auxiliary frame.

2. In an apparatus of the class described, a main frame, a rigid auxiliary frame attached thereto, pair of movable arms attached to said main frame, a weighing hopper having a post secured to said movable arms, a weighing apparatus carried by said main frame, a lever having one end connected to said weighing apparatus, said hopper post having a knife edge connected with said lever, and a support suspended from said auxiliary frame and having a knife edge connection with the outer end of said lever.

3. In a machine of the class described, a frame supported on said machine, means for releasably holding said frame against movement, a rigid auxiliary frame extending from said main frame, a pair of parallel motion arms having anti-frictional relation with said main frame, a hopper having a post connected to said arms, a weighing apparatus upon said main frame, a lever connected with said weighing apparatus and having a knife edge connection with said post, a rod suspended from said auxiliary frame, and means carried by said rod for forming a fulcrum for said lever for the purpose set forth.

4. In an apparatus of the class described, a main frame, a hopper, a post movably carried by said main frame for rotatably supporting said hopper, a pulley loosely mounted upon said post for relative rotation with respect thereto, a connection between said pulley and hopper, and means for rotating said pulley for rotating said hopper.

5. In a machine of the class described, a main frame, an auxiliary frame extending therefrom, a pair of parallel motion arms connected to said main frame, a post carried by said arms, a weighing apparatus carried by said main frame, a connection between said weighing apparatus and said post, and means for rigidly supporting one of said arms from said auxiliary frame.

6. In a machine of the class described, a main frame, a weighing hopper movably supported by said main frame, a rigid auxiliary frame extending from the main frame, and means for connecting said hopper against movement with respect to said auxiliary frame.

7. In a machine of the class described, a main frame, an auxiliary frame extending from said main frame, a pair of parallel motion arms having anti-frictional connection with said main frame, post having anti-frictional connection with said parallel motion arms, a weighing hopper supported by said post, a weighing apparatus on said main frame responsive to the movements of said weighing hopper, and means for firmly supporting said hopper upon said auxiliary frame.

8. In a machine of the class described, a main frame, a pair of parallel motion arms pivoted to said frame, a hopper having a depending member pivotally connected to the free ends of said arms, a scale, and a weight lever connecting said depending member and scale.

9. In a machine of the class described, a main frame, parallel motion arms pivoted to the main frame, a post carried by said arms, a hopper rotatably mounted upon said post and means for rotating said hopper.

In testimony whereof I have hereunto subscribed my name at Aurora, Kane County, Illinois.

HARRY H. BARBER.